United States Patent
Wessels

[11] Patent Number: 5,142,201
[45] Date of Patent: Aug. 25, 1992

[54] LAMP BALLAST CIRCUIT

[75] Inventor: Johannes H. Wessels, Eindhoven, Netherlands

[73] Assignee: U.S. Philips Corporation, New York, N.Y.

[21] Appl. No.: 758,322

[22] Filed: Aug. 27, 1991

Related U.S. Application Data

[63] Continuation of Ser. No. 651,687, Feb. 6, 1991, abandoned.

[30] Foreign Application Priority Data

Feb. 14, 1990 [NL] Netherlands ......................... 9000350

[51] Int. Cl.⁵ ...................... H05B 41/24; H05B 41/36
[52] U.S. Cl. ................................ 315/209 R; 315/226; 315/248; 315/291

[58] Field of Search .................... 315/209 R, 226, 248, 315/291, 307, DIG. 2, DIG. 4, DIG. 5, DIG. 7

[56] References Cited

U.S. PATENT DOCUMENTS 4,935,672  6/1990  Lammers et al. ............... 315/226 X Primary Examiner—David Mis
Attorney, Agent, or Firm—Robert T. Mayer

[57] ABSTRACT

A circuit arrangement comprising a DC/AC converter for supplying power to a lamp upon receiving energy from a DC voltage source; the converter includes a branch A having at least one switching element and a control branch connected to the switching element; the control branch comprises a coil shunted by a capacitor; the circuit arrangement also includes a load branch with an inductor connected to a parallel arrangement of an inductance and capacitance.

18 Claims, 2 Drawing Sheets

LAMP BALLAST CIRCUIT

This is a continuation of application Ser. No. 07/651,687, filed Feb. 6, 1991 now abandoned.

The invention relates to a circuit arrangement comprising a DC-AC converter for igniting and supplying a lamp, which DC-AC converter is provided with input terminals suitable for being connected to the poles of a DC voltage source, a branch A comprising
  at least one switching element,
  a control branch of which one end is connected to a control electrode of the switching element and another end to a first main electrode of the switching element, which control branch comprises inductive means L3,
a load branch E comprising
  inductive means L1 and
  a load circuit comprising two branches B and C, in which branch B comprises inductive means L2 and branch C comprises capacitive means,
one end of branch A being connected to an end of branch E, and another end of branch A being connected to an input terminal, while a further end of branch E is connected to the other input terminal.

Such a circuit arrangement is known from the European Patent Application EP-A-0 222 441, to which U.S. Pat. No. 4,748,383 corresponds.

The known circuit arrangement comprises two switching elements and two control branches. The control electrode and the first main electrode of each of the two switching elements are connected to the ends of a control branch. In each control branch, the inductive means L3 are formed by a secondary winding of a control transformer whose primary winding forms part of branch C.

When a lamp is operated with the known circuit arrangement, a high-frequency alternating current with an operating frequency f flows in the load circuit. The load circuit is coupled to the control branches of the two switching elements through the control transformer. The switching elements are made alternately conducting and non-conducting with a frequency equal to the operating frequency f by means of this coupling. Thus power is transferred from the input of the DC-AC converter to the load circuit.

The known circuit arrangement is particulary suitable for operating an electrodeless lamp. The coupling between such a lamp and the circuit arrangement may be realised in that, for example, the inductive means L2 are arranged in a cavity of the lamp vessel. The operating frequency f is chosen to be relatively high, usually in the order of one MHz, in order to restrict to a certain extent the required dimension of the inductive means L2 in this mode of lamp operation.

Such a high operating frequency imposes special requirements on the rate at which the two switching elements become conducting and non-conducting alternately. In the known circuit arrangement, a relatively high power is absorbed by the control branches through the control transformer in order to render the switching elements conducting and non-conducting. This adversely affects the efficiency of the known circuit arrangement.

The invention has for its object to reduce the amount of power absorbed by the control branches and dissipated in the circuit arrangement while the switching elements are made conducting and non-conducting, and thus to improve the efficiency of the circuit arrangement.

According to the invention, this object is achieved in that the circuit arrangement of the kind described in the opening paragraph is characterized in that each control branch is shunted by a branch D which comprises capacitive means. Each control branch and the branch D shunting the control branch form part of a resonant circuit. The capacitive means in branch D are so chosen that a resonance frequency of the relevant resonant circuit differs only to a slight degree from the operating frequency f of the DC-AC converter. Since the resonant circuits are almost resonant at the operating frequency f of the circuit arrangement, the high-frequency voltages present across the capacitive means in the branches D will rise and fall, respectively relatively quickly. Since the high-frequency voltage across the capacitive means of a branch D is equal to the voltage present between the control electrode and the first main electrode of the relevant switching element, this switching element will become conducting and non-conducting relatively quickly, so that a good power transfer from the DC voltage source to the lamp can be realised, while the power absorbed by the resonant circuit is relatively small.

In a special embodiment of a circuit arrangement according to the invention, the DC-AC converter is so dimensioned that the resonance frequency f1 of the resonant circuit is higher than a frequency f2 for which the voltage across the load branch E coupled to the lamp is in phase with the current through the load branch E. The operating frequency f of such a DC-AC converter is smaller than f1 and greater than f2.

Since the operating frequency is greater than f2, the operation of the DC-AC converter is inductive. Inductive operation means that the phase of the voltage across the load branch is ahead of the current through the load branch. The power dissipated in the switching element is relatively low in the case of inductive operation because the switching element is made conducting at moments when the voltage across the switching element is relatively low.

Generally, the luminous flux of a lamp operated by means of a high-frequency alternating current can be adjusted through adjustment of the amplitude of the high-frequency alternating current. If this high-frequency alternating current is generated by means of a DC-AC converter, such an amplitude adjustment of the high-frequency alternating current can be achieved through adjustment of the DC voltage present between input terminals of the DC-AC converter. It is found in practice for present-art circuit arrangements that a change in the DC voltage leads not only to a change in the amplitude of the high-frequency alternating current, but also to a change in the operating frequency f. Such a change in the operating frequency f may cause the circuit arrangement to stop functioning since stable lamp operation is not possible at the changed frequency. This restricts the range over which the lamp power can be adjusted through adjustment of the DC voltage present between the input terminals of the DC-AC converter. It was found for the circuit arrangement according to the invention, however, that a change in the voltage between the input terminals does effect a change in the amplitude of the high-frequency alternating current, but that the operating frequency f remains substantially unchanged. The advantageous result of this is that it is possible to adjust the luminous flux of a lamp operated in the circuit arrangement according to the invention over a wide range in a simple manner in that the voltage between the input terminals of the DC-AC converter is adjusted.

The invention will be explained in more detail with reference to a drawing of an embodiment.

Figure 1:
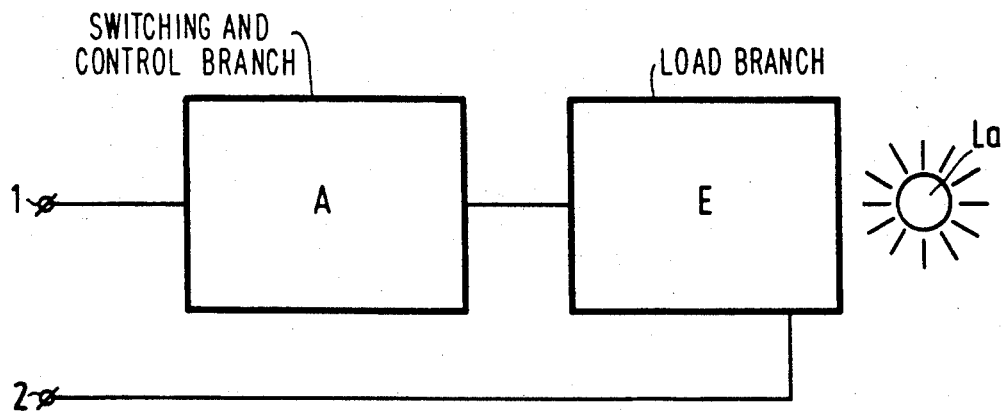
FIG. 1 shows a diagrammatic picture of the build-up of an embodiment of a circuit arrangement according to the invention.

In FIG. 1, reference numerals 1 and 2 denote input terminals suitable for being connected to a DC voltage source. A is a branch which comprises at least one switching element S1 and a control branch, of which one end is connected to a control electrode of the relevant switching element and a further end to a first main electrode of the relevant switching element. The control branch comprises inductive means L3 and is shunted by a branch D which comprises capacitive means. E is a load branch comprising inductive means L1 and a load circuit comprising two parallel branches B and C, branch B comprising inductive means L2 and branch C comprising capacitive means. The inductive means L2 are arranged in a cavity of a lamp vessel of a lamp La. An end of branch A is connected to input terminal 1 and a further end of branch A is connected to an end of branch E. A further end of branch E is connected to input terminal 2.

Figure 2:
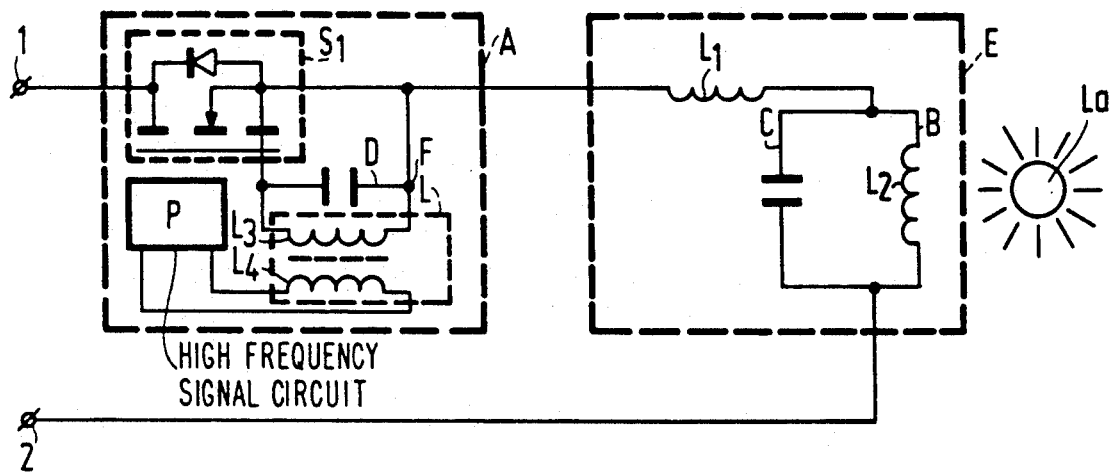
FIG. 2 shows the embodiment of FIG. 1 in greater detail.

In FIG. 2, branch A is formed by the switching element S1, circuit arrangement P, transformer L and capacitor D, which in this embodiment forms branch D. The switching element S1 comprises a flywheel diode, whose anode is connected to a first main electrode of the switching element S1 and whose cathode is connected to a second main electrode of the switching element S1. Load branch E in this embodiment consists of coil L1, which forms the inductive means L1 present in the load branch E, and of the load circuit. The load circuit consists of capacitor C, which in this embodiment forms the branch C, and of coil L2, which in this embodiment forms branch B.

P is a circuit arrangement for generating a high-frequency signal. An end of a primary winding L4 of the transformer L is connected to an output of circuit arrangement P and a further end of primary winding L4 is connected to a further output of circuit arrangement P. A secondary winding L3 of transformer L in this embodiment forms the inductive means L3 which are present in the control branch of switching element S1. An end of secondary winding L3 is connected to a control electrode of the switching element S1 and a further end of secondary winding L3 is connected to the first main electrode of switching element S1. The secondary winding L3 is shunted by the capacitor D. The second main electrode of the switching element S1 is connected to input terminal 1. The first main electrode of switching element S1 is connected to an end of the coil L1. A further end of the coil L1 is connected to one end of capacitor C and to an end of the coil L2. A further end of coil L2 and a further end of capacitor C are connected to input terminal 2.

The operation of the circuit arrangement described is as follows.

When a DC voltage source is connected to input terminals 1 and 2, circuit arrangement P generates a high-frequency signal with frequency f. This high-frequency signal is present between the ends of the primary winding L4 of the transformer L. As a result, a high-frequency pulsatory voltage with frequency f is present between the ends of the secondary winding L3 of transformer L. This voltage is also present across the capacitor D and between the control electrode of the switching element S1 and the first main electrode of the switching element S1. The capacitance of capacitor D is chosen in such a way that a resonance frequency of a resonant circuit comprising capacitor D and secondary winding L3 differs only to a slight degree from the frequency f. As a result, the voltage between the control electrode and the first main electrode of the switching element increases and decreases, respectively, relatively quickly. This means that the switching element S1 becomes conducting and non-conducting relatively quickly, while the amount of power taken up from the circuit arrangement P is relatively small.

Figure 3:
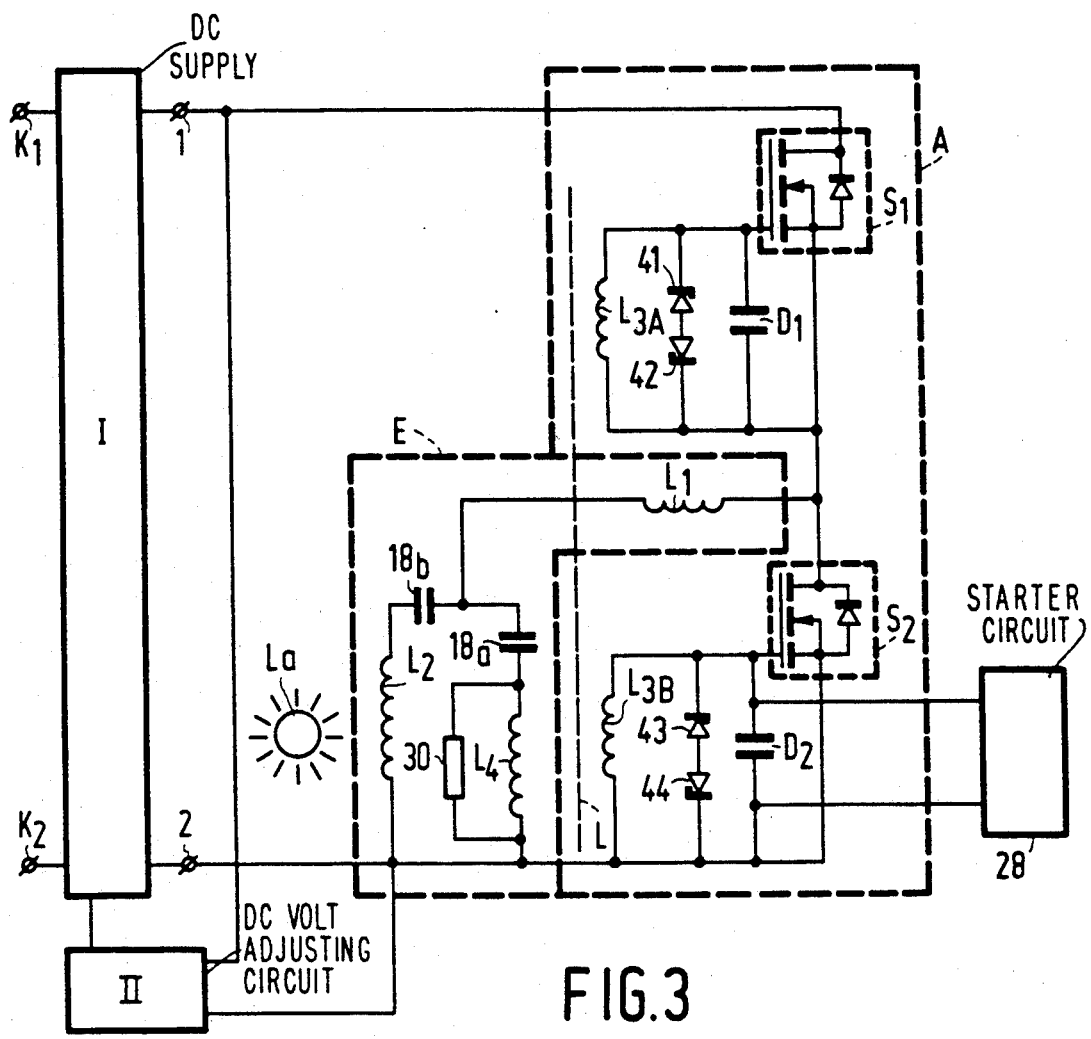
FIG. 3 shows an embodiment of a circuit arrangement according to the invention comprising two switching elements.

The circuit arrangement shown in FIG. 3 comprises means for generating an adjustable DC voltage and an incomplete half bridge. 1 and 2 are input terminals suitable for being connected to a DC voltage source. Branch A is formed by switching elements S1 and S2, secondary winding L3A and L3B of transformer L, zener diodes 41, 42, 43 and 44, and capacitors D1 and D2. Load branch E consists of coil L1 and the load circuit. The load circuit consists of coil L2, primary winding L4 of transformer L, capacitors 18a and 18b, and resistor 30. 28 denotes a starter circuit for generating a starting pulse for starting the incomplete half bridge.

Switching elements S1 and S2 each comprise a flywheel diode whose anode is connected to a first main electrode of the relevant switching element and whose cathode is connected to a second main electrode of the relevant switching element.

The coil L2 forms the branch B. Capacitors 18a and 18b, primary winding L4 and resistor 30 together form branch C. The two capacitors 18a and 18b constitute the capacitive means of branch C. Coil L1 forms the inductive means L1 of the load branch E. A first control branch is formed by secondary winding L3A. A second control branch consists of secondary winding L3B. Secondary winding L3A forms the inductive means L3 of the first control branch, while secondary winding L3B forms the inductive means L3 of the second control branch. The capacitor D1 forms the branch D which shunts the first control branch, while the capacitor D2 forms the branch D which shunts the second control branch.

Coil L2 is arranged inside the cavity of a lamp vessel of an electrodeless lamp La.

I constitutes means for generating a DC voltage, which means are connected to the input terminals 1 and 2. K1 and K2 are input terminals of means I suitable for being connected to poles of a voltage supply source. II forms further means for adjusting the DC voltage. II is coupled to input terminals 1 and 2 and to the means I for this purpose.

Means I and II may be constructed in widely varying ways. If the supply voltage delivered by the voltage supply source is an AC voltage for example, the means I may comprise rectifying means and the means II may comprise a variable transformer.

Another possibility is for the means I to comprise one or several combinations of DC-DC converters of the up, down or flyback converter type. In that case the DC voltage can be adjusted in that the duty cycle(s) of the switch(es) present in this/these converter(s) is/are adjusted by means II.

The second main electrode of the switching element S1 is connected to input terminal 1. An end of the first control branch is connected to a control electrode of the switching element S1, and a further end of the first control branch is connected to the first main electrode of the switching element S1. The capacitor D1 shunts the first control branch. The first control branch is also shunted by a series circuit of two zener diodes 41 and 42, whose anodes are interconnected. The first main electrode of the switching element S1 is connected to the second main electrode of switching element S2. Of the second control branch, one end is connected to a control electrode of the switching element S2 and a further end of the second control branch is connected to the first main electrode of the switching element S2. The capacitor D2 shunts the second control branch. The second control branch is also shunted by a series circuit of two zener diodes 43 and 44, whose anodes are interconnected. The first main electrode of switching element S2 is connected to input terminal 2.

One end of coil L1 is connected to a junction point of the switching elements S1 and S2. A further end of coil L1 is connected to an end of capacitor 18a and an end of capacitor 18b. A further end of capacitor 18b is connected to an end of coil L2. A further end of coil L2 is connected to input terminal 2. A further end of capacitor 18a is connected to primary winding L4. A further end of primary winding L4 is connected to input terminal 2. Resistor 30 shunts primary winding L4.

The operation of the circuit shown in FIG. 3 is as follows.

When a voltage supply source is connected to input terminals K1 and K2 of means I, a DC voltage is present between input terminals 1 and 2 of the DC-AC converter and the switching elements S1 and S2 are made alternately conducting and non-conducting with a frequency f. The result is that a high-frequency substantially square-wave voltage with frequency f is present across the load branch. This high-frequency square wave voltage causes a high-frequency alternating current with frequency f to flow in the load circuit. Since the primary winding L4 forms part of the load circuit, there is high-frequency voltage with frequency f present between the ends of L4. This high-frequency voltage across primary winding L4 generates a high-frequency voltage with frequency f between the ends of the secondary winding L3A and a high-frequency voltage with frequency f between the ends of the secondary winding L3B. These high-frequency voltages are also present across capacitors D1 and D2, respectively.

The capacitance of capacitor D1 is chosen in such a way that a resonance frequency of a resonant circuit comprising secondary winding L3A and capacitor D1 differs only to a slight degree from the frequency f. The capacitance of the capacitor D2 was also chosen in such a way that a resonance frequency of a resonant circuit comprising secondary winding L3B and the capacitor D2 differs only to a slight degree from the frequency f. The result of this is that the high-frequency voltage across capacitor D1 and also the high-frequency voltage across the capacitor D2, respectively, increase and decrease quickly. Since the high-frequency voltage across the capacitor D1 is equal to the high-frequency voltage present between the control electrode of switching element S1 and the first main electrode of the switching element S1, this switching element becomes conducting and non-conducting, respectively, relatively quickly, while the amount of power taken up through the transformer L is relatively small. Since the high-frequency voltage across capacitor D2 is equal to the high-frequency voltage present between the control electrode of switching element S2 and the first main electrode of the switching element S2, switching element S2 also becomes conducting and non-conducting, respectively, relatively quickly, while the amount of power taken up through the transformer L is relatively small.

Resistor 30 is included in the load circuit in order to optimize the phase relationship between the high-frequency alternating current in the load circuit and the high-frequency voltages across capacitor D1 and capacitor D2.

The luminous flux of the lamp can be adjusted by having means II adjust the DC voltage generated by means I.

Figure 5:
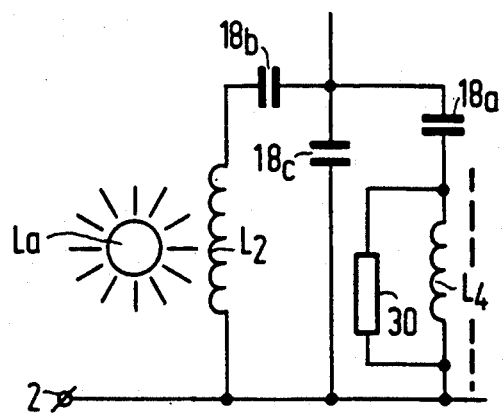
FIG. 5 shows a further alternative configuration of the load circuit.

FIG. 5 shows a configuration of the load circuit in which the series circuit of capacitor 18a and primary winding L4 is shunted by a capacitor 18c. It is possible in this configuration to adjust the power abosorbed by the control transformer through a suitable choice of the ratio of the impedance of capacitor 18c to the sum of the impedances of capacitor 18a and primary winding L4.

Figure 4:
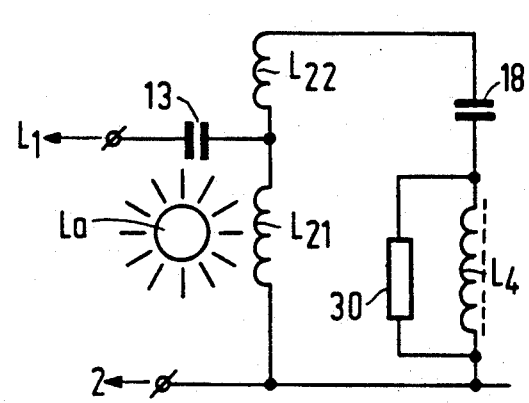
FIG. 4 shows an alternative configuration of the load circuit.

The primary winding L4, which forms part of the load circuit in the circuits shown in FIGS. 3, 4 and 5, may also be included elsewhere in the load branch E.

The series circuit of zener diode 41 and zener diode 42 serves to limit the voltage between the control electrode of switching element S1 and the first main electrode of switching element S1. The series circuit of zener diode 43 and zener diode 44 serves to limit the voltage between the control electrode of switching element S2 and the first main electrode of switching element S2. These zener diodes pass current exclusively during the ignition of the lamp La.

The capacitance present in branch C is divided over capacitor 18a and 18b. A junction point of capacitor 18a and capacitor 18b is connected to the end of the coil L1 remote from the junction point of the switching elements S1 and S2. The ratio of the capacitance of capacitor 18a to the capacitance of capacitor 18b is preferably chosen in such a way that the impedance of the load circuit coupled to the lamp La is substantially equal to the sum of the impedances of the DC voltage source, the branch A and the coil L1, since this promotes an optimal power transfer between the DC voltage source and the lamp.

In a practical embodiment of this circuit arrangement for operating a lamp with a power rating of 90 W, the inductance value of coil L1 was 14 $\mu$H. The inductance value of coil L2 was 13.5 $\mu$H. The capacitances of capacitors 18a and 18b were 1 nF and 680 pF, respectively. The resonance frequency of the resonant circuit comprising secondary winding L3A and capacitor D1 was approximately 3.2 MHz. The resonance frequency of the resonant circuit comprising the secondary winding L3B and capacitor D2 was also approximately 3.2 MHz. The frequency f2 at which a voltage across the load branch E coupled to the lamp is in phase with a current through the load branch E was approximately 2.1 MHz. The operating frequency f was approximately 2.65 MHz. The amount of power absorbed by each control branch was reduced from approximately 1 Watt to approximately 300 mWatt by the presence of the capacitors $D_1$ and $D_2$.

Figure 6:
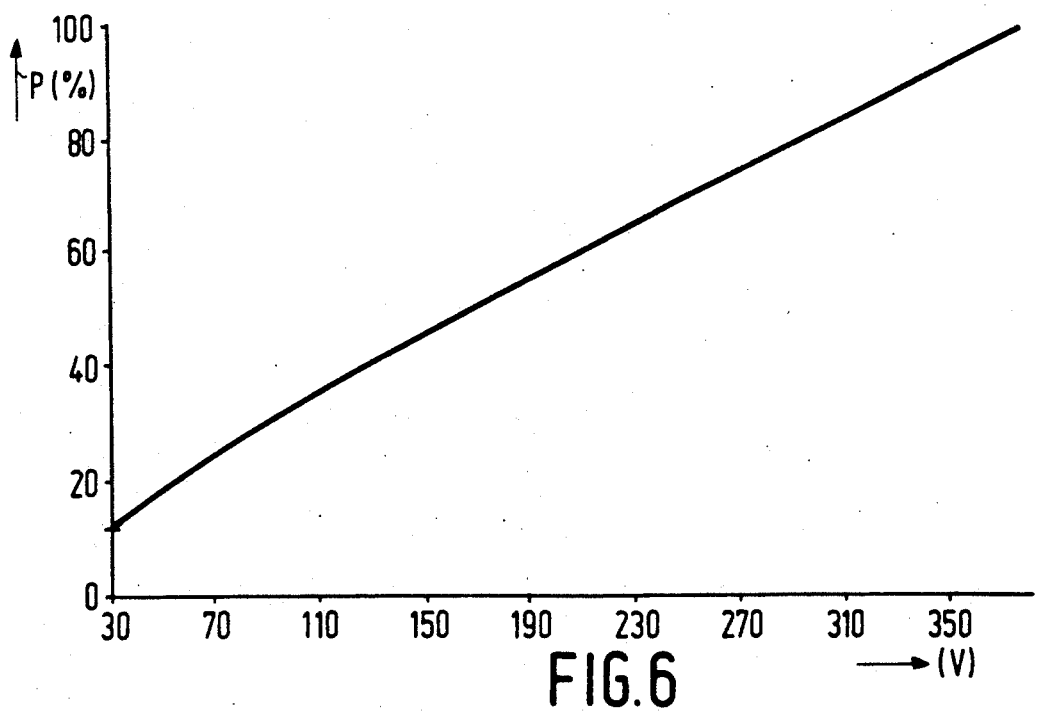
FIG. 6 shows the power consumed by a lamp operated on a circuit arrangement according to the invention as a function of the DC voltage with which the circuit arrangement is supplied.

A lamp operated on this circuit arrangement can be dimmed. The curve in FIG. 6 represents the power derived from the DC-voltage source from which the circuit arrangement is fed, expressed as a percentage of the rated lamp power, as a function of the DC voltage, expressed in volts, delivered by the DC-voltage source. The operating frequency f was approximately 2.65 MHz for all power consumption values. FIG. 6 illustrates the possibility of adjusting the power consumed by the lamp over a considerable range through adjustment of the DC voltage present between the input terminals.

Power transfer can also be optimized when the load circuit is arranged as shown in FIG. 4. The coil L2 in FIG. 3 is replaced here by two coils L21 and L22. The sum of the inductances of coil L21 and coil L22 is equal to the inductance of coil L2. The capacitance of capacitor 18 is equal to the capacitance of a series circuit of capacitor 18a and capacitor 18b, as in FIG. 3. The end of the coil L1 remote from the junction point of the two switching elements S1 and S2 is in this case connected to a junction point of coil L21 and coil L22 through a capacitor 13. The capacitor 13 prevents a direct current flowing through the load branch. In this case the ratio of the inductance of coil L21 to that of coil L22 is so chosen that the impedance of the load circuit coupled to the lamp La is substantially equal to the sum of the impedances of the DC voltage source, the branch A and the coil L1.

The resonance frequency of the resonant circuit comprising secondary winding L3A and capacitor D1 is set for a higher frequency than a frequency f2, for which a voltage across the load branch E coupled to the lamp is in phase with a current through the load branch E, through a suitable choice of the capacitance of capacitor D1. Similarly, the resonance frequency of the resonant circuit comprising secondary winding L3B and capacitor D2 is set for a higher value than the frequency f2 through a suitable choice of the capacitance of capacitor D2. Thus it is achieved that the operating frequency f of such a DC-AC converter is lower than each of the resonance frequencies of the resonant circuits, and higher than f2. Since the operating frequency is higher than f2, the operation of the DC-AC converter is inductive. Inductive operation means that the phase of the voltage across the load branch is ahead of the current through the load branch. The power dissipated in each switching element is relatively small in the case of inductive operation, since each switching element is made conducting while the voltage across the switching element is relatively low.

I claim:

1. A circuit arrangement comprising a DC-AC converter for igniting and supplying a lamp, which DC-AC converter is provided with
input terminals suitable for being connected to the poles of a DC voltage source,
a branch A comprising
at least one switching element,
a control branch of which one end is connected to a control electrode of the switching element and another end to a first main electrode of the switching element, which control branch comprises inductive means L3,
a load branch E comprising
inductive means L1 and
a load circuit comprising two branches B and C, in which branch B comprises inductive means L2 and branch C comprises capacitive means,
one end of branch A being connected to an end of branch E, and another end of branch A being connected to an input terminal, while a further end of branch E is connected to the other input terminal, characterized in that the control branch is shunted by a branch D which comprises capacitive means.

2. A circuit arrangement as claimed in claim 1 comprising a control transformer which has a primary and a secondary winding, the primary winding being coupled to the load branch E and the secondary winding forming part of the inductive means L3, characterized in that a resonance frequency f1 of a resonant circuit comprising the control branch and the branch D shunting the control branch is higher than a frequency f2, for which a voltage across the load branch E coupled to the lamp is in phase with a current through the load branch E.

3. A circuit arrangement as claimed in claim 1, characterized in that the circuit arrangement is provided with means for generating a DC voltage, which means are connected to the input terminals, and with further means for adjusting said DC voltage.

4. A circuit arrangement as claimed in claim 2, characterized in that the circuit arrangement is provided with means for generating a DC voltage, which means are connected to the input terminals, and with further means for adjusting said DC vlotage.

5. A circuit arrangment comprising a DC/AC converter for igniting and suppling a lamp, said DC/AC converter being provided with two input terminals suitable for being connected to a DC voltage source, a branch circuit A comprising two switching elements each with a control electrode and a first and second main electrode, said first main electrode of one of said switching elements being connected to the second main electrode of the other switching element to form a junction therewith, said branch circuit A also including a separate control branch associated with each switching element, one end of each control branch being connected to the control electrode of its associated switching element and another end of each control branch being connected to the first main electrode of its associated switching element, each control branch comprising inductive means, said circuit arrangement also including a load branch E comprising inductive means and a load circuit comprising two branches B and C, in which branch B comprises inductive means L2 and branch C comprises capacitive means, said junction of branch A being connected to an end of branch E, and an end of branch A being connected to an input terminal, while a further end of branch E is connected to the other input terminal and also to another end of branch A and wherein each control branch is shunted by a branch (D1 or D2) which comprises capacitive means.

6. A circuit arrangement in accordance with claim 5, wherein said load inductive means L1 is connected directly to said junction of branch A.

7. A circuit arrangement in accordance with claim 6, wherein a diode is connected between the first and second main electrodes of each switching element.

8. A circuit arrangement in accordance with claim 7, wherein a pair of zener diodes is connected across each branch D1 and D2.

9. A circuit arrangement in accordance with claim 7, wherein each control branch ($L_{3A}$, $L_{3B}$) is a secondary winding of a transformer, said transformer primary winding (L4) being connected in parallel with said branches B and C of said load circuit.

10. A circuit arrangement in accordance with claim 9, wherein branch C comprises two interconnected capacitors and said load inductive means L1 is connected between said two capacitors.

11. A circuit arrangement in accordance with claim 10, wherein an additional capacitor is connected in parallel with one of said interconnected capacitors and said inductive means of branch B.

12. A circuit arrangement in accordance with claim 9, wherein said branch B comprises inductive means with two interconnected sections and said load inductive means L1 is connected between said two sections through a capacitor.

13. A circuit arrangement in accordance with claim 9, wherein a starter circuit is connected across one of the capacitive means of one of branches D1 or D2.

14. A circuit arrangement in accordance with claim 5, wherein a resident frequency f1 of each control branch and its associated shunting branch is higher than a frequency f2 for which a voltage across the load branch is in phase with a current through said load branch.

15. A circuit arrangement in accordance with claim 14, wherein a means for generating a DC voltage is connected across the input terminals and means are included for adjusting the DC voltage whereby the luminous flux of a lamp controlled by the circuit arrangement can be adjusted over a wide range by adjusting said DC voltage.

16. A circuit arrangement in accorcance with claim 14, wherein said DC/AC converter is so dimensioned that the operating frequency f of the DC/AC converter is smaller than f1 and greater than f2.

17. A circuit arrangement in accordance with claim 14, wherein a means for generating a DC voltage is connected across the input terminals and means are included for adjusting the DC voltage whereby the amplitude of the high frequency alternating current is changed but the operating frequency f of the DC/AC converter remains substantially unchanged.

18. A circuit arrangement in acccordance with claim 9, wherein a resistor is connected across said primary winding.

* * * * *

UNITED STATES PATENT AND TRADEMARK OFFICE
CERTIFICATE OF CORRECTION

PATENT NO. : 5,142,201
DATED : Aug. 25, 1992
INVENTOR(S) : Wessels

It is certified that error appears in the above-indentified patent and that said Letters Patent is hereby corrected as shown below:

Column 8, line 40, change "suppling" to --supplying--.

Signed and Sealed this

Twenty-third Day of July, 1996

Attest:

BRUCE LEHMAN

Attesting Officer

Commissioner of Patents and Trademarks